US007346742B2

United States Patent
Day et al.

(10) Patent No.: US 7,346,742 B2
(45) Date of Patent: Mar. 18, 2008

(54) METHODS AND STRUCTURE FOR BYPASSING MEMORY MANAGEMENT MAPPING AND TRANSLATION FEATURES

(75) Inventors: Brian A. Day, Colorado Springs, CO (US); Bradley Dean Besmer, Colorado Springs, CO (US); Jana Lynn Richards, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 527 days.

(21) Appl. No.: 10/991,903

(22) Filed: Nov. 18, 2004

(65) Prior Publication Data

US 2006/0107022 A1 May 18, 2006

(51) Int. Cl.
*G06F 12/00* (2006.01)
(52) U.S. Cl. ...................... 711/138; 711/207
(58) Field of Classification Search ............ None
See application file for complete search history.

(56) References Cited

U.S. PATENT DOCUMENTS

2005/0188176 A1* 8/2005 Chiang et al. ............. 711/206

* cited by examiner

*Primary Examiner*—Reginald Bragdon
*Assistant Examiner*—Mehdi Namazi
(74) *Attorney, Agent, or Firm*—Duft, Borsen, & Fishman, LLP

(57) ABSTRACT

Methods and associated structures for bypassing virtual memory and memory mapping management features provided in a memory controller applied to simpler computing applications. In one aspect hereof, simpler, embedded computing applications may utilize standard memory controllers including cash management and memory component interfacing features but may bypass virtual memory management features within the same memory controller component. Rather, features and aspects hereof intercept memory accesses generated by the memory controller for address translation features and perform simpler address substitution to apply an appropriate translated address to the system bus.

15 Claims, 2 Drawing Sheets

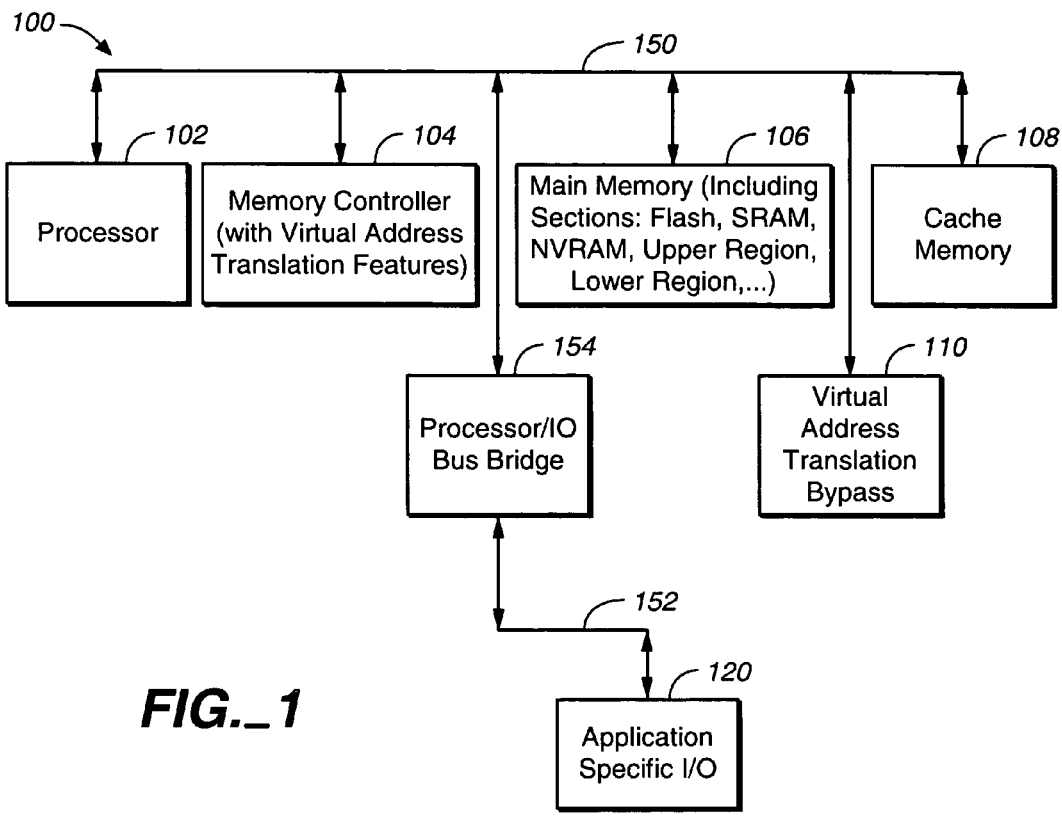
FIG._1
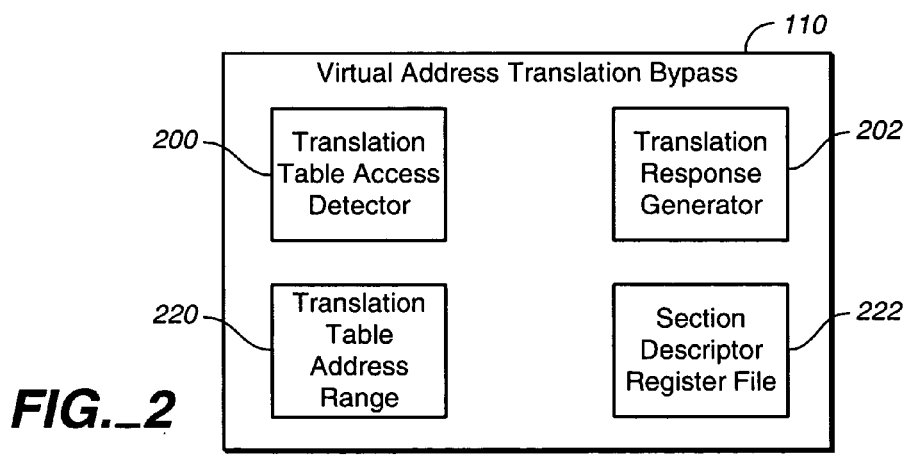
FIG._2

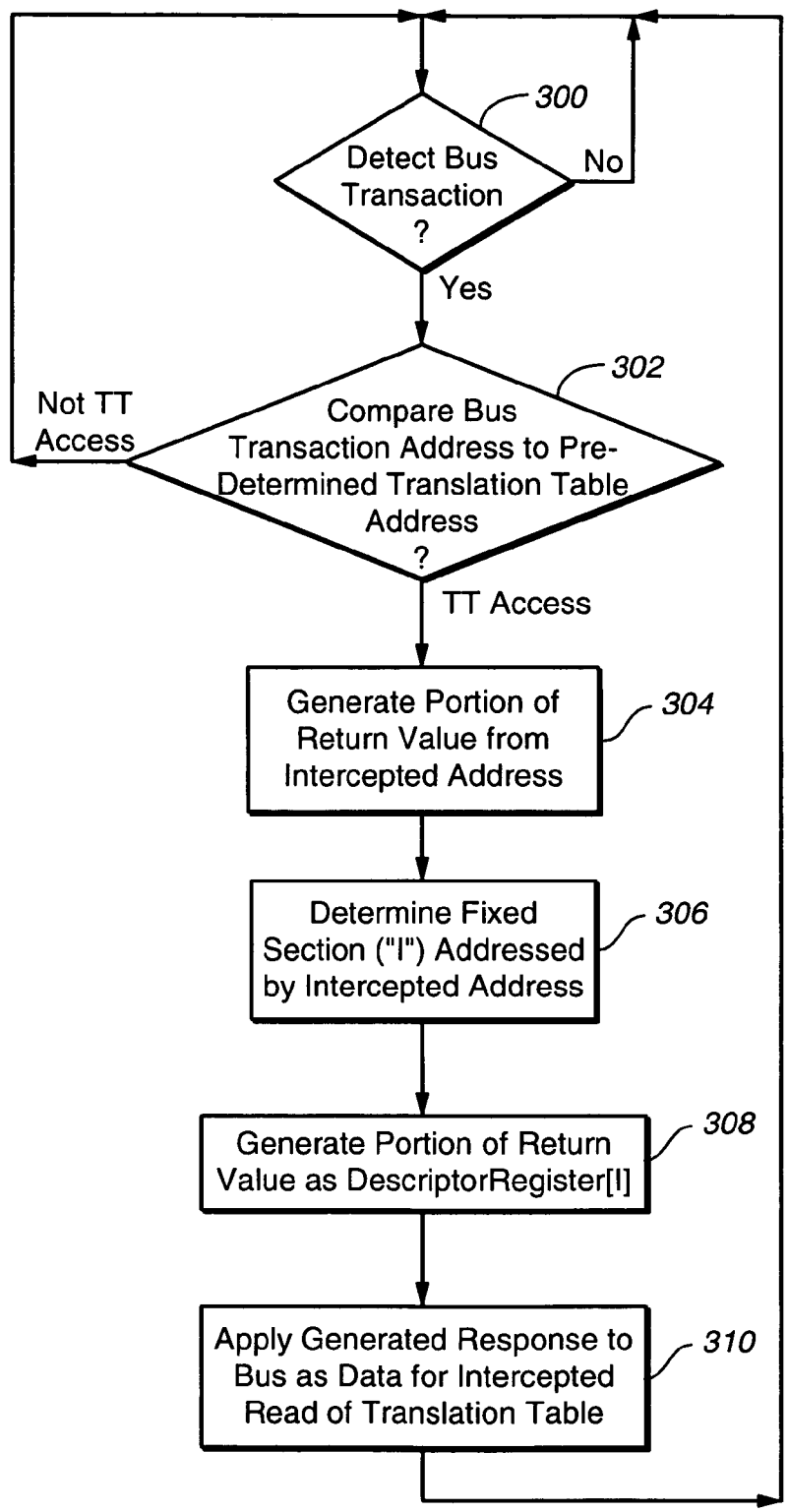
FIG._3

METHODS AND STRUCTURE FOR BYPASSING MEMORY MANAGEMENT MAPPING AND TRANSLATION FEATURES

BACKGROUND OF THE INVENTION

1. Field of the Invention

The invention generally relates to memory management in computing systems and more specifically relates to methods and structures for bypassing complexity associated with memory management features of typical memory management coprocessors. The invention is particularly useful in embedded system applications where the complexity of feature-rich memory management for virtual addressing is unnecessary.

2. Discussion of Related Art

Computing systems generally comprise one or more general and/or special purpose processors coupled to one or more types of memory devices. The memory devices are generally utilized for storing program instructions to be executed by the various processors of the system and for storing data to be manipulated by the operating program instructions. Most present-day computing systems include one or more hierarchical layers of memory for such purposes. First, a main memory structure provides the desired capacity of memory required for storage of executing programmed instructions and/or associated data. The main memory may consist of any combination of volatile and nonvolatile memory including both random access memory (RAM) and read only memory (ROM). One or more additional hierarchical layers of memory may be designated as cache memory. The cache memory typically is higher performance memory relative to the devices selected for the main memory structure. Given the higher performance and associated higher cost, cache memory is generally smaller in capacity as compared to the main memory structure.

In particular, as regards the main memory structure, many computing applications require substantially more capacity for stored program instructions and associated data than may be practically achieved with semiconductor, electronic memory devices. For this reason, methods and structures associated with virtual memory where a secondary or backing store such as a disk drive is used to provide an essentially unlimited extension to the size of the main memory. When particular portions of program instructions or related data are required, virtual memory management features determine whether the requested instructions or data are presently residing in main memory (or in higher speed cache memory) if the requested information is available, it is returned from the main memory or cache memory structure in which it was found to the requesting processor. If the requested information is not present in the main memory or cache memory structures, the virtual memory management features retrieve the information from the backing store (i.e. from a disk drive) and restore the retrieved information in an appropriate location of main memory (and/or cache). Numerous other mapping and security features are typically included with such virtual memory management features of a system.

As presently practiced in the art, a number of memory management related features are typically integrated within a single memory management coprocessor—a portion of the supporting "chip set" associated with a particular processor architecture. For example, typical memory management coprocessors include logic to control low level interaction with memory devices, virtual memory management features, and cache memory management features. In some memory management, processors, these features may be co-resident and continuously operable such that the system designer must provide appropriate supporting circuits and memory to enable proper functioning of each of these features embedded within the memory management coprocessor.

In many computing applications such as personal computers and workstations, all of these memory management features are typically applied to operation of the computing system. However, in a number of computing applications such as embedded computing applications, some of these features may be unnecessary or even a hindrance to the overall architecture. In particular, in embedded systems such as a storage controller computing application, it may be a problem to utilize such a complex memory management coprocessor. In many such embedded computing applications, particular memory management features are not required and may add complexity and/or related cost to the embedded application. For example, a typical embedded computing application may properly utilize the low level memory device interface features of a memory controller and the cache memory management features of a memory controller but would typically have little or no need for the virtual memory management and mapping features of most memory controllers. The virtual memory features of a typical memory management coprocessor often requires the addition of a memory component for storing translation table information associated with virtual memory address translation.

Although such virtual memory management and mapping features are less useful in such embedded computing applications, as presently practiced in the art, the embedded systems designer must none the less provide associated supporting circuitry and memory dedicated to the translation tables typically required by virtual memory management features. Providing this extra control circuitry and associated memory can add significant cost and complexity to an embedded system computing application.

It is evident from the above discussion that a need exists for improved structures and methods to reduce the need for wasteful complexity and/or cost associated with memory controllers and memory management in simpler, computing applications such as embedded computing applications.

SUMMARY OF THE INVENTION

The present invention solves the above and other problems, thereby advancing the state of the useful arts, by providing structures and associated methods for using a typical memory management coprocessor but bypassing virtual memory and mapping features so as to obviate the need for complex/costly additional components in a simple computing application. In particular, features and aspects hereof intercept a memory management generated read for virtual memory mapping address translation and provide a simple translation of the applied virtual address to sections of memory based on configurable region or section range definitions. These memory management bypass features therefore obviate the need for auxiliary memory devices for storing more complete translation tables associated with typical virtual memory and mapping memory management features.

A first feature provides a method for bypassing memory mapping features generated by a memory controller, the method comprising: detecting a memory controller bus transaction on a bus coupled to the memory controller wherein the detected bus transaction is associated with memory mapping features of the memory controller; generating a response to the bus transaction without requiring access to memory mapping tables associated with the memory mapping features; and applying the generated response to the bus for return to the memory controller.

Another aspect hereof further provides that the step of detecting further comprises: intercepting the bus transaction on the bus; determining whether the bus transaction is associated with memory mapping features of the memory controller; and allowing the bus transaction to complete normally in response to a determination that the bus transaction is not associated with memory mapping features of the memory controller.

Another aspect hereof further provides that the step of determining further comprises: comparing information in the intercepted bus transaction with a static address associated with said memory mapping tables.

Another aspect hereof further provides that the step of generating further comprises: generating the response using one of a plurality of static descriptor base addresses.

Another aspect hereof further provides that the step of generating the response further comprises: generating the response using a first portion of the information in the intercepted bus transaction; and selecting said one of the plurality of static descriptor base addresses using a second portion of the information in the intercepted bus transaction.

Another feature provides a system comprising: a memory for storing programmed instructions and data; a processor for executing programmed instructions stored in the memory; a memory controller for controlling access to the memory by the processor wherein the memory controller includes memory management features to translate virtual addresses supplied by the processor into physical addresses in the memory; a bus coupling the memory and the processor and the memory controller; and a translation bypass element to perform memory management address translation features without requiring a translation table memory structure associated with the memory controller.

Another aspect hereof further provides that the translation bypass element further comprises: a translation interceptor for intercepting bus transactions on the bus generated by the memory controller to access a translation table memory; and a translation response generator for returning a response to the intercepted bus transaction.

Another aspect hereof further provides that the translation interceptor further comprises: means for detecting the bus transaction based on addressing information associated with the bus transaction.

Another aspect hereof further provides that the translation response generator further comprises: means for generating the response based on pre-configured address information regarding fixed ranges of the system.

Another aspect hereof further provides that the means for generating further comprises: programmable registers for storing said pre-configured address information wherein the generated response includes information derived from the programmable registers.

Another feature provides an apparatus in a computing system including a processor coupled through a bus to a memory controller for controlling access to an associated system memory wherein the memory controller includes virtual memory translation features that use a translation table memory, the apparatus coupled to the bus for obviating the need for translation table memory comprising: an interceptor for intercepting bus transaction by the memory controller to read the translation table memory; and a response generator to generate a response to the intercepted memory read that does not require use of a translation table memory.

Another aspect hereof further provides that the interceptor further comprises: a detector for comparing an address of the intercepted bus transaction with a pre-determined value corresponding to the translation table memory to determine that the bus transaction is a memory controller bus transaction to read the translation table memory.

Another aspect hereof further provides that the interceptor further comprises: a programmable register for storing the pre-determined value.

Another aspect hereof further provides that the response generator further comprises: means for generating the response based upon a plurality of static descriptor addresses.

Another aspect hereof further provides that the means for generating further comprises: a plurality of descriptor address registers for storing the static descriptor address for each of a corresponding plurality of address ranges associated with the computing system.

Another aspect hereof further provides that the processor is a ARM926ES processor and wherein the bus is an AMBA AHB bus.

BRIEF DESCRIPTION OF THE DRAWINGS

FIG. 1 is a block diagram of a system embodying features and aspects hereof to obviate the need to an auxiliary memory component associated with virtual address translation table structures of a memory management controller.

FIG. 2 is a block diagram depicting functional elements within and exemplary address translation bypass element as in FIG. 1 and in accordance with features and aspects hereof.

FIG. 3 is a flowchart describing operation of a method in accordance with features and aspects hereof to intercept translation table memory accesses and to generate a response thereto to obviate the need for a translation table memory element.

DETAILED DESCRIPTION OF THE DRAWINGS

FIG. 1 is a block diagram of a system 100 embodying features and aspects hereof. System 100 may be any typical computing system including, for example, an embedded system such as a storage system controller or other peripheral device controller. System 100 may include processor 102—a general or special purpose processor for providing general purpose computation and data processing and/or special purpose control and data processing features to manage overall operation of the system 100. For example, processor 102 may be an ARM926 processor particularly useful in embedded system applications. The processor bus 150 couples processor 102 to memory controller 104, main memory 106, and cache memory 108. Processor 102 fetches data and instructions from main memory 106 and/or cache memory 108 to perform desired processing and control for the particular application. Memory controller 104 manages access to memory 106 and if to cache memory 108. Processor bus 150 may be, for example, an AMBA AHB bus coupling the various components to the processor.

In the context of an embedded system 100, main memory 106 may be implemented as a variety of different memory component each dedicated to a particular purpose in the system 100. For example, main memory 106 may include read-only memory (ROM, PROM, EPROM, EEPROM, etc.) devices for storing program instructions. Main memory may also include a portion of RAM memory (DRAM, SDRAM, etc.) for storing data used in operation of the system 100 and/or for storing an operational version of the program instructions copied from the ROM memory. Non-volatile, Flash and other similar memory devices may be used for persistently storing configuration and other similar data. Each of these different types of memory may be associated with a distinct range of physical addresses in the range of addresses generated by processor 102 and memory controller 104. In like manner, application specific I/O devices 120 may be addressed as memory mapped addresses though physically they may be attached to a separate I/O bus 152 via a bus bridge element 154. Each of these I/O devices as well as the various types of memory components in the system 100 may be associated with a distinct range of physical memory addresses. In general, these ranges of addresses are fixed and determined by the system 100 designer.

As is generally known in the art, memory controller 104 manages low level interface timing and signaling associated with control of memory devices. In particular, low level control signals associated with present-day high speed SDRAMs or other high speed memory devices are managed by memory controller 104. Further, as generally known in the art, memory controller 104 includes features to manage cache memory 108 in conjunction with main memory 106. Cache memory 108 is generally higher speed memory as compared to main memory 106 (i.e., high speed static memory components). Information read from or written to main memory 106 may be saved in cache memory 108 under control of memory controller 104 for more rapid subsequent access.

Still further, as generally known in the art, memory controller 104 may include virtual address translation features. Virtual addressing features may be applied in numerous manners but are typically applied to permit processor 102 to utilize virtual addresses spanning a larger range than is available in the physical memory configuration of main memory 106. These virtual addressing features are generally operable to translate a processor supplied virtual address into a corresponding location in main memory or cache memory. If the virtual address being accessed is not presently residing in main memory or in cache memory, it may be residing on a secondary or backing store such as a disk drive or other mass storage device (not shown).

To track the current location of pages or portions of memory (i.e., in main memory or on backing store), the memory controller generally maintains a dedicated memory component (not shown in FIG. 1) for storing address translation tables. The translation tables provide tables that map ranges of virtual addresses into corresponding pages or segments and then identify the present location of the corresponding page or segment. When the memory controller is requested by the processor to access a particular virtual address, it first determines whether the requested virtual address is presently in cache memory. If the memory controller determines that a translated address is not found in cache memory, it may generate a transaction on the bus 150 to attempt to access the translation table—the mapping table structure stored in its dedicated memory component (not shown). As generally known in the art and as noted above, such a translation table structure requires another memory component dedicated to storing the translation table data structures. Even when the address translations for a particular application are minimal, such a memory component can be significant in size and must generally be high speed to maintain desired performance of system 100.

By contrast, system 100 obviates the need for such an additional memory component dedicated to storing virtual address translation table structures. Rather, virtual address translation bypass element 110 monitors for bus transactions applied to processor bus 150 that represent read access bus transactions targeting the translation table memory component (not present in system 100). Virtual address translation bypass element 110 therefore intercepts such read accesses generated by memory controller 104 in attempting to perform virtual memory address translation and provides fixed responses—predetermined in accordance with a small set of address values associated with the bypass element 110. Thus, virtual address translation bypass element 110 obviates the need for the additional memory component dedicated to storing virtual address translation tables.

Those of ordinary skill in the art will readily recognize that the various components shown in FIG. 1 are intended merely as exemplary of a typical system configuration in which features and aspects hereof may be beneficially applied. Numerous equivalent architectures for such a system 100 will be readily apparent to those of ordinary skill in the art. In particular, numerous equivalent architectures utilizing a variety of commercially available processors and corresponding memory controllers and related chipsets will be readily apparent to those of ordinary skill in the art. The ARM926 processor and associated AHB bus structures are intended as merely exemplary of one possible embodiment where features and aspects hereof may be beneficially applied.

Further, an ARM926 processor and its corresponding memory management controller (integrated within the processor integrated circuit) as exemplified in FIG. 1 access the use the processor bus to access the translation table memory component (not show in FIG. 1). Those of ordinary skill in the art will recognize equivalent processor and memory controller products and configurations where a dedicated port may be used to access the translation table memory component rather than the processor bus. Such design choices in the architecture and configuration of processors, memory controllers, and translation table memory components are well known to those of ordinary skill in the art. In all cases, bypass element 110 is adapted to monitor the transactions that represent attempts to access the translation table memory component by the processor and/or its corresponding memory controller.

FIG. 2 is a block diagram showing additional details of exemplary functional elements within virtual address translation bypass element 110 of FIG. 1. Bypass element 110 as shown in FIG. 2 may include a translation table access detector element 200 for detecting or intercepting translation table access bus transactions generated by a memory controller (104 of FIG. 1). In one embodiment, such a bus transaction may be detected based on the address applied to the bus to access the translation table. In such an embodiment, the range of addresses that define the translation table as utilized by the memory controller may be stored in translation table address range registers 220. Further, where the address of the translation table is fixed in a particular design, translation table address range element 220 may be "hard-wired" as address-decode logic as opposed to a programmable register or registers. In alternative embodiments, a bus transaction to access the translation table memory component may be identified by other parameters or attributes of the bus transaction applied to the bus or applied to other signals paths monitored by the bypass element 110 and more specifically monitored by the translation table access detector element 200 within the bypass element 110.

Having so detected or intercepted a translation table access bus transaction generated by the memory controller, translation response generator element 202 generates an appropriate response to provide a translated address corresponding to pre-determined ranges of addresses in the particular system or application. For example, as noted above in embedded system applications, it is common to have a variety of types of memory each dedicated to different purposes within the embedded system. Further, I/O devices may be accessed through memory mapped addresses. Each of these various exemplary devices but the may correspond to a specific, pre-determined, fixed range of addresses within the embedded system. Translation response generator element 202 therefore serves to generate an appropriate response to the intercepted virtual address translation table access bus transaction to translate the virtual address in the intercepted transaction into an appropriate address corresponding to the fixed, pre-determined ranges of acceptable components in the embedded system. Section descriptor register file 222 represents a relatively small set of programmable registers used to define the ranges of acceptable virtual addresses corresponding to the particular complement of fixed, pre-determined components in the particular system. As noted above with regard to element 220, where the range of acceptable addresses and corresponding components is fixed, section descriptor register file 222 may be implemented as fixed address logic that generates fixed responses to particular virtual address ranges. In addition to embedded systems, any general purpose computing system with such a complement of fixed, pre-determined ranges of usable memory addresses may usefully apply the virtual address translation bypass element functions described herein.

Those of ordinary skill in the art will readily recognize that the functional elements 200, 202, 220, and 222 of FIG. 2 are merely exemplary functional elements within such a bypass element. A wide variety of equivalent functional decompositions and particular logic circuits to implement such features will be readily apparent to those of ordinary skill in the art. The functional decomposition of bypass element 110 shown in FIG. 2 is therefore intended merely as exemplary of one possible embodiment of such a translation table access bypass element.

FIG. 3 is a flowchart describing an exemplary method of operation for a translation table access bypass element as described above and FIGS. 1 and 2. Element 300 is first operable to await detection of a bus transaction on the bus associated with the at the memory controller being monitored. Upon detection of some bus transaction, element 302 is next operable to compare the bus transaction address information to a predetermined range of addresses representing the translation table memory component address associated with the memory controller. In other words, element 302 determines whether the bus transaction detected by element 300 is a bus transaction generated by the memory controller to access the translation table structure. The memory controller, in general, generates such a bus transaction when it determines that a particular virtual address generated by the processor is not presently resident in the cache memory managed by the memory controller. If element 302 determines that the intercepted bus transaction is not a translation table access bus transaction generated by the memory controller, processing continues looping back to element 302 await detection and interception of another bus transaction. The bus transaction will be completed normally by other elements of the system.

If element 302 detects that a translation table access bust transaction has been intercepted, element 304 is operable to generate a first portion of the return value based upon the intercepted virtual address. The supplied virtual address will correspond to a range of virtual addresses associated with some particular corresponding component within the system. A portion of the virtual address may therefore represent an offset within the corresponding component while another portion may be used to determine which component is represented by the intercepted virtual address. Element 304 may therefore be operable to generate the first portion of the return value that corresponds to an offset within an identified component of the system. Element 306 then determines which fixed section or component is addressed by the intercepted virtual address (represented as index value "I"). The identified section or component is represented by the index or offset ("I") into a bank of programmable registers or other fixed logic representing a second portion of the translated address associated with a particular component of the system. Element 308 then generates a second portion of the return value based on the indexed value from the descriptor register file determined above by element 306. As noted above, the descriptor register file may be implemented as a bank or file of programmable register values identifying ranges of virtual addresses and corresponding base addresses for associated components. In the alternative, the descriptor register file may be implemented as a sequence of fixed logic devices performing an limited translation of applied virtual addresses into corresponding base component addresses for a relatively small number of fixed components in the applied system. Lastly, element 310 is operable to apply the generated response to the system bus as data in response to the intercepted translation table access bus transaction. Thus, the method of FIG. 3 simulates virtual address translation in a system in a manner to obviate the need for a dedicated memory component for storing translation table data structures on behalf of the memory controller. Those of ordinary skill in the art will readily recognize that the flowchart of FIG. 3 is intended merely as representative of one exemplary embodiment of methods or processes operable in a translation table access bypass element in accordance with features and aspects hereof. Numerous equivalent processes and methods will be readily apparent to those of ordinary skill in the art.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. A method for bypassing memory mapping features generated by a memory controller, the method comprising:

detecting a memory controller bus transaction on a bus coupled to the memory controller wherein the detected bus transaction is associated with memory mapping features of the memory controller;

generating a response to the bus transaction without requiring access to memory mapping tables associated with the memory mapping features; and applying the generated response to the bus for return to the memory controller.

2. The method of claim 1 wherein the step of detecting further comprises:

intercepting the bus transaction on the bus;

determining whether the bus transaction is associated with memory mapping features of the memory controller; and allowing the bus transaction to complete normally in response to a determination that the bus transaction is not associated with memory mapping features of the memory controller.

3. The method of claim 2 wherein the step of determining further comprises:

comparing information in the intercepted bus transaction with a static address associated with said memory mapping tables.

4. The method of claim 1 wherein the step of generating further comprises:

generating the response using one of a plurality of static descriptor base addresses.

5. The method of claim 4 wherein the step of generating the response further comprises:

generating the response using a first portion of the information in the intercepted bus transaction; and selecting said one of the plurality of static descriptor base addresses using a second portion of the information in the intercepted bus transaction.

6. A system comprising:

a memory for storing programmed instructions and data;

a processor for executing programmed instructions stored in the memory;

a memory controller for controlling access to the memory by the processor wherein the memory controller includes memory management features to translate virtual addresses supplied by the processor into physical addresses in the memory;

a bus coupling the memory and the processor and the memory controller; and a translation bypass element to perform memory management address translation features without requiring a translation table memory structure associated with the memory controller.

7. The system of claim 6 wherein the translation bypass element further comprises:

a translation interceptor for intercepting bus transactions on the bus generated by the memory controller to access a translation table memory; and a translation response generator for returning a response to the intercepted bus transaction.

8. The system of claim 7 wherein the translation interceptor further comprises:

means for detecting the bus transaction based on addressing information associated with the bus transaction.

9. The system of claim 7 wherein the translation response generator further comprises:

means for generating the response based on pre-configured address information regarding fixed ranges of the system.

10. The system of claim 9 wherein the means for generating further comprises:

programmable registers for storing said pre-configured address information wherein the generated response includes information derived from the programmable registers.

11. In a computing system including a processor coupled through a bus to a memory controller for controlling access to an associated system memory wherein the memory controller includes virtual memory translation features that use a translation table memory, an apparatus coupled to the bus for obviating the need for translation table memory comprising:

an interceptor for intercepting bus transaction by the memory controller to read the translation table memory; and a response generator to generate a response to the intercepted memory read that does not require use of a translation table memory.

12. The apparatus of claim 11 wherein the interceptor further comprises:

a detector for comparing an address of the intercepted bus transaction with a pre-determined value corresponding to the translation table memory to determine that the bus transaction is a memory controller bus transaction to read the translation table memory.

13. The apparatus of claim 12 wherein the interceptor further comprises:

a programmable register for storing the pre-determined value.

14. The apparatus of claim 11 wherein the response generator further comprises:

means for generating the response based upon a plurality of static descriptor addresses.

15. The apparatus of claim 14 wherein the means for generating further comprises:

a plurality of descriptor address registers for storing the static descriptor address for each of a corresponding plurality of address ranges associated with the computing system.

* * * * *